(12) United States Patent
Liu

(10) Patent No.: US 11,835,171 B2
(45) Date of Patent: Dec. 5, 2023

(54) BRACKET APPARATUS

(71) Applicant: AUTEL INTELLIGENT TECHNOLOGY CORP., LTD., Guangdong (CN)

(72) Inventor: Lianjun Liu, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 113 days.

(21) Appl. No.: 17/644,184

(22) Filed: Dec. 14, 2021

(65) Prior Publication Data

US 2022/0107049 A1    Apr. 7, 2022

Related U.S. Application Data

(63) Continuation of application No. PCT/CN2020/097741, filed on Jun. 23, 2020.

(30) Foreign Application Priority Data

Jun. 24, 2019 (CN) .......................... 201910550811.1

(51) Int. Cl.
  *F16M 11/04* (2006.01)
  *F16B 2/00* (2006.01)
  *F16B 2/18* (2006.01)

(52) U.S. Cl.
  CPC .......... *F16M 11/046* (2013.01); *F16B 2/005* (2013.01); *F16B 2/185* (2013.01)

(58) Field of Classification Search
  CPC .... F16B 7/10; F16B 7/105; F16B 7/14; F16B 7/1418; F16B 7/1454; F16B 2/005;
  (Continued)

(56) References Cited

U.S. PATENT DOCUMENTS

| 3,770,236 A | 11/1973 | Marsh et al. |
| 4,375,934 A * | 3/1983 | Elliott ................. E04F 21/1822 254/108 |
| 6,551,226 B1 * | 4/2003 | Webber ................... F16B 7/105 482/148 |
| 7,364,533 B2 * | 4/2008 | Baker ................ A63B 22/0605 403/324 |

(Continued)

FOREIGN PATENT DOCUMENTS

| CN | 201539676 U | 8/2010 |
| CN | 201707803 U | 1/2011 |

(Continued)

OTHER PUBLICATIONS

Supplementary European Search Report dated Jun. 30, 2022; Application No. 20830961.7.

*Primary Examiner* — Alfred J Wujciak

(57) ABSTRACT

The disclosure relates to the technical field of automobile maintenance and repair as well as device calibration, and in particular, to a bracket apparatus. The bracket apparatus includes a base, a vertical rod and a clamping assembly. One end of the vertical rod is mounted to the base. The clamping assembly is mounted to the vertical rod. The clamping assembly includes a sliding member, a push rod assembly, a handle and an elastic member. One end of the sliding member is sleeved on the vertical rod. The sliding member is movable along the vertical rod. An other end of the sliding member is configured to carry a calibration element. The push rod assembly can be movably mounted to the sliding member in a preset direction. Two ends of the elastic member respectively abut against an inner wall of the sliding member and the push rod assembly. The elastic member can drive one end of the push rod assembly to be tightly pressed against the vertical rod. The sliding member is fixed to the vertical rod to prevent the sliding member from free falling (Continued)

and smashing. In addition, the handle is rotatably mounted to the sliding member to drive one end of the push rod assembly to be removed from contact with the vertical rod, so that the sliding member is slidable freely along the vertical rod. Therefore, the height of the calibration apparatus hung on the sliding member can be adjusted as needed, to meet different height requirements and calibration requirements.

15 Claims, 7 Drawing Sheets

(58) Field of Classification Search
CPC ..... F16B 2/185; E04H 12/182; F16M 11/046; F16M 2200/02; F16M 2200/00; F16M 2200/022; F16M 2200/025; F16M 2200/027
USPC ...... 248/145.6, 155.1, 161, 162.1, 404, 407, 248/408, 409, 410, 411, 157, 423, 219.3, 248/219.4, 121, 122.1, 123.11, 123.2, 248/125, 1, 125.3, 125.8
See application file for complete search history.

(56) References Cited

U.S. PATENT DOCUMENTS

| | | | |
|---|---|---|---|
| 10,820,689 B2* | 11/2020 | Liu | A47B 9/06 |
| 2010/0258701 A1* | 10/2010 | Foreman | B62K 19/36 |
| | | | 248/408 |
| 2020/0124072 A1* | 4/2020 | Tsai | F16B 7/105 |

FOREIGN PATENT DOCUMENTS

| | | |
|---|---|---|
| CN | 203614534 U | 5/2014 |
| CN | 204692259 U | 10/2015 |
| CN | 107676580 A | 2/2018 |
| CN | 107682490 A | 2/2018 |
| CN | 108036174 A | 5/2018 |
| CN | 108161853 A | 6/2018 |
| CN | 108453646 A | 8/2018 |
| CN | 207961934 U | 10/2018 |
| CN | 108953897 A | 12/2018 |
| CN | 208179458 U | 12/2018 |
| CN | 208566000 U | 3/2019 |
| DE | 10 2015 208 404 B3 | 9/2016 |
| JP | 2002-130586 A | 5/2002 |
| JP | 2017-150498 A | 8/2017 |

* cited by examiner

BRACKET APPARATUS

CROSS-REFERENCE

This application claims priority to PCT Application No. PCT/CN2020/097741 filed on Jun. 23, 2020, which claims priority to Chinese Patent Application No. 201910550811.1, filed with the National Intellectual Property Administration, PRC, on Jun. 24, 2019 and entitled "BRACKET APPARATUS", which is incorporated herein by reference in its entirety.

BACKGROUND

Technical Field

This application relates to the technical field of automobile maintenance and repair as well as device calibration, and in particular, to a bracket apparatus that can carry a calibration element.

Related Art

In the field of automobile maintenance and repair as well as manufacturing, a plurality of positions in the same coordinate direction need to be calibrated during calibration of a device. For example, during the mounting and maintenance and repair of automobile radar, if the mounting position and angle of the radar have large deviations, the radar may fail to sense, causing safety hazards. Therefore, the automobile radar needs to be calibrated after being mounted.

At present, a bracket apparatus is usually used to carry a radar calibration apparatus. The bracket apparatus includes a vertical rod and a slider. The slider is mounted to the vertical rod, and the slider carries the radar calibration apparatus. However, when the slider slides on the vertical rod, no self-locking function is provided. This is likely to cause the slider to slide in a free fall and smash.

SUMMARY

In order to solve the above technical problem, embodiments of the disclosure provide a bracket apparatus with a locking function to solve the technical problem that a slider of the bracket apparatus is easy to fall freely in the prior art.

The embodiments of the disclosure adopt the following technical solution to resolve the technical problem.

A bracket apparatus is provided, including:
a base;
a vertical rod, one end of the vertical rod being mounted to the base; and
a clamping assembly, including a sliding member, a push rod assembly, a handle and an elastic member, where the sliding member is sleeved on the vertical rod and is configured to carry a calibration element;
the push rod assembly includes a rod body and a backing plate, one side of the backing plate being in contact with the vertical rod, and another side of the backing plate being connected to the rod body;
the elastic member is disposed between an inner wall of the sliding member and the backing plate and is configured to provide an elastic restoring force, so that the backing plate tightly abuts against the vertical rod;
the handle is configured to drive the rod body to move away from the vertical rod; and
when the handle drives the rod body to move away from the vertical rod, the backing plate is removed from contact with the vertical rod, so that the sliding member is movable in a length direction of the vertical rod.

Optionally, the sliding member includes a rod clamp and a housing;
the rod clamp is sleeved on the vertical rod and is movable along the vertical rod; and
one end of the housing is connected to the rod clamp, and the handle is rotatably mounted to the housing.

Optionally, an axis of rotation of the handle is perpendicular to a direction of movement of the rod body.

Optionally, the rod clamp includes a first clamping plate, a second clamping plate, a third clamping plate and a fourth clamping plate;
the first clamping plate and the fourth clamping plate are opposite to each other, and the second clamping plate and the third clamping plate are opposite to each other and are both connected between the first clamping plate and the fourth clamping plate;
the first clamping plate is spaced apart from the vertical rod, and the backing plate is located between the first clamping plate and the vertical rod; and
the fourth clamping plate abuts against the vertical rod.

Optionally, a first friction plate is provided on the fourth clamping plate; and
the fourth clamping plate abuts against the vertical rod through the first friction plate.

Optionally, the second clamping plate and/or the third clamping plate abut(s) against the vertical rod.

Optionally, the housing includes two first side plates; and
the handle and the rod body are both disposed between the two first side plates, and the handle is rotatably connected to the two first side plates.

Optionally, the handle includes a handle body and a link;
one end of the handle body is rotatably connected to the housing; and
one end of the link is rotatably connected to an other end of the handle body, and an other end of the link is rotatably connected to the rod body.

Optionally, an inclined face is provided on the handle, and an abutting post is provided on the rod body, the abutting post abutting against the inclined face; and
the handle pushes the abutting post during rotation, so that the abutting post moves along the inclined face to drive the push rod assembly to move.

Optionally, a movable hole is provided on the housing; and one end of the rod body facing away from the backing plate is received in the movable hole, and the rod body is movable along the movable hole.

Optionally, the bracket apparatus includes a holder mounted to the housing; and
the holder is configured to carry the calibration element.

Optionally, the holder includes a base plate, an arc-shaped portion and a fixed plate;
the arc-shaped portion and the fixed plate are respectively disposed at two opposite ends of the base plate;
an arc-shaped groove is provided on the housing, the arc-shaped portion being mounted to the arc-shaped groove, and the arc-shaped portion being slidable along the arc-shaped groove; and
the fixed plate is configured to be connected to the calibration element.

Optionally, the holder includes an adjustment rod;
an arc-shaped adjustment groove is provided on the base plate, and an adjustment hole is provided on the sliding member, one end of the adjustment rod passing through the adjustment groove and being disposed in the adjustment hole, and the adjustment groove being slidable relative to the adjustment rod; and when the adjustment rod is tightened, the holder is fixed relative to the clamping assembly, and when the adjustment rod is loosened, the holder is movable relative to the clamping assembly.

Optionally, the direction of movement of the rod body is perpendicular to the length direction of the vertical rod.

Optionally, a second friction plate is provided on a side of the backing plate facing the vertical rod; and the backing plate abuts against the vertical rod through the second friction plate.

In comparison to the prior art, in the bracket apparatus of the disclosure, the elastic member of the clamping assembly can drive the push rod assembly to tightly press against the vertical rod, so that the sliding member is fixed to the vertical rod to prevent the sliding member from free falling and smashing. In addition, the handle can drive the push rod assembly to be removed from contact with the vertical rod, so that the sliding member is slidable freely along the vertical rod. Therefore, the height of the calibration apparatus hung on the sliding member can be adjusted as needed, to meet different height requirements and calibration requirements.

BRIEF DESCRIPTION OF THE DRAWINGS

One or more embodiments are described by way of example with reference to the corresponding figures in the accompanying drawings. The exemplary descriptions are not to be construed as limiting the embodiments. Elements in the accompanying drawings that have same reference numerals are represented as similar elements. Unless otherwise particularly stated, the figures in the accompanying drawings are not drawn to scale.

DETAILED DESCRIPTION

For ease of understanding the disclosure, the disclosure is described in more detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. The terms "vertical", "horizontal", "left", "right", "inner", "outside", and similar expressions used in this specification are merely used for an illustrative purpose.

Unless otherwise defined, meanings of all of the technical and scientific terms used in this specification are the same as those usually understood by those skilled in the art of the disclosure. The terms used in the specification of the disclosure are merely intended to describe objectives of the specific embodiment, and are not intended to limit the disclosure. The term "and/or" used in this specification includes any or all combinations of one or more related listed items.

In addition, technical features involved in different embodiments of the disclosure described below may be combined together if there is no conflict.

Figure 1:
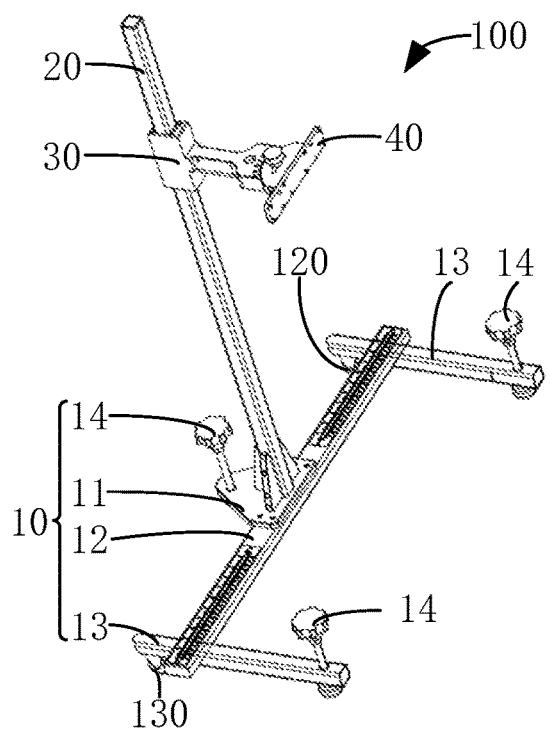
FIG. 1 is a schematic structural diagram of a bracket apparatus according to an embodiment of the disclosure.

Referring to FIG. 1, a bracket apparatus 100 provided in an embodiment of the disclosure includes a base 10, a vertical rod 20 and a carrying assembly. The carrying assembly includes a clamping assembly 30 and a holder 40. The vertical rod 20 is vertically disposed. One end of the vertical rod is fixedly mounted to the base 10. One end of the clamping assembly 30 is movably mounted to the vertical rod 20. The clamping assembly 30 is slidable along the vertical rod 20. An other end of the clamping assembly 30 is connected to the holder 40. The holder 40 is configured to carry a required calibration apparatus.

The base 10 includes a pedestal 11, a beam 12, a support rod 13 and a horizontal adjustment member 14. The pedestal 11 and the support rod 13 are respectively mounted to the beam 12. The horizontal adjustment member 14 is mounted to the pedestal 11 and the support rod 13.

The pedestal 11 is flat. One end of the pedestal 11 is mounted to the middle of the beam 12. An other end of the pedestal 11 protrudes from the beam 12. One end of the vertical rod 20 is fixedly mounted to the pedestal 11.

Two scales 120 are provided on a surface of the beam 12 facing the vertical rod 20. The two scales 120 are disposed on two opposite sides of the pedestal 11. The two scales 120 are in a mutually symmetrical arrangement relative to the vertical rod 20.

A quantity of the support rods 13 is two. The two support rods 13 are respectively disposed at two opposite ends of the beam 12. The two support rods 13 are parallel to each other and both are perpendicular to the beam 12. A pulley 130 is provided at one end of each of the two support rods 13. The pulley 130 is configured to drive the bracket apparatus 100 to move.

The quantity of the horizontal adjustment members 14 is three. Two of the horizontal adjustment members 14 are respectively provided at one ends of the two support rods 13 away from the pulley 130. The other one of the horizontal adjustment members 14 is disposed at one end of the pedestal 11 protruding from the beam 12. The two horizontal adjustment members 14 disposed on the support rod are both located on the same side of the beam 12. The other one of the horizontal adjustment members disposed on the pedestal 11 is located on an other side of the beam 12. The three horizontal adjustment members 14 are distributed in an isosceles triangle. The horizontal adjustment member 14 includes a handle 140 and an adjustment rod 142. The handle 140 is fixed to one end of the adjustment rod 142. An other end of the adjustment rod 142 passes through the pedestal 11 or the support rod 13 and abuts against the ground. The adjustment rod 142 is threadedly connected to the pedestal 11 or the support rod 13. An axial direction of the adjustment rod 142 is the same as a length direction of the vertical rod 20. Rotating the handle 140 can cause the adjustment rod 142 to move relative to the pedestal 11 in the axial direction to adjust a pitch angle of the pedestal 11.

It may be understood that, in some other embodiments, the quantity of the horizontal adjustment members 113 can be set to four according to actual needs, for example. The two horizontal adjustment members 14 are disposed on the pedestal 11. The other two horizontal adjustment members 14 are respectively disposed on the two support rods 13, as long as the pitch angle of the pedestal 11 can be adjusted.

Figure 2:
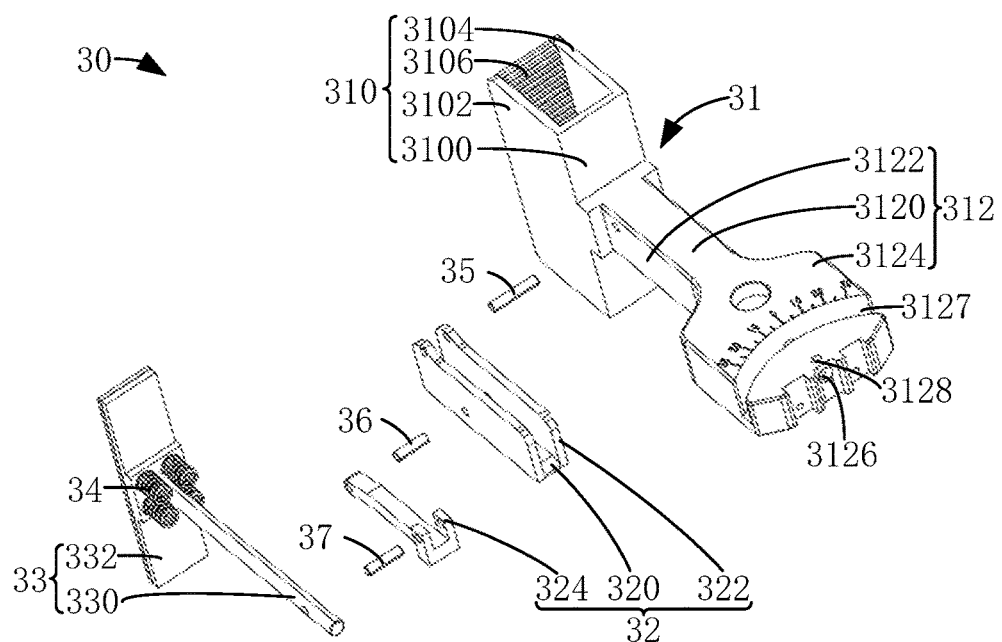
FIG. 2 is a schematic exploded view of a clamping assembly of the bracket apparatus shown in FIG. 1.
Figure 3:
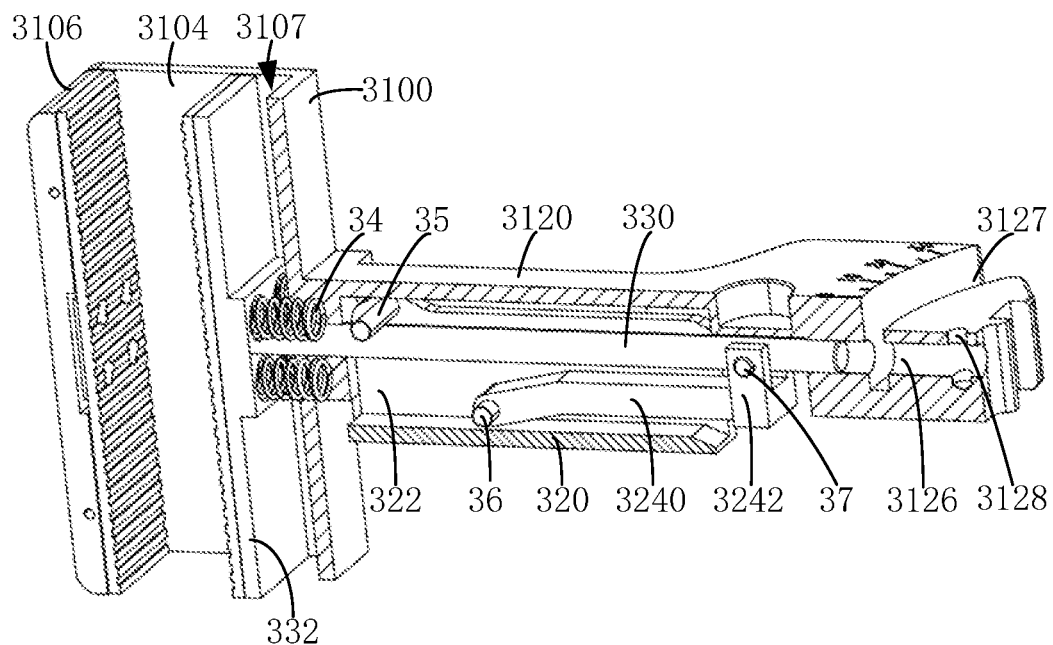
FIG. 3 is a schematic assembly diagram of the clamping assembly shown in FIG. 2, where some elements are omitted.

Referring to FIG. 2 and FIG. 3 together, the clamping assembly 30 includes a sliding member 31, a handle 32, a push rod assembly 33 and an elastic member 34. One end of the sliding member 31 is sleeved on the vertical rod. An other end of the sliding member 31 is configured to carry the required calibration apparatus. The push rod assembly 33 is movably mounted to the sliding member 31. The push rod assembly 33 is movable relative to the sliding member 31 in a preset direction. The preset direction is at a preset angle to the length direction of the vertical rod 20. One end of the handle 32 is rotatably connected to the sliding member 31. The handle 32 is rotatable relative to the sliding member 31. An other end of the handle 32 is movably connected to the push rod assembly 33. The handle 32 can drive the push rod assembly 33 to move relative to the sliding member 31. A value of the preset angle is between 0 and 180 degrees. Preferably, the value of the preset angle is 90 degrees.

Figure 4:
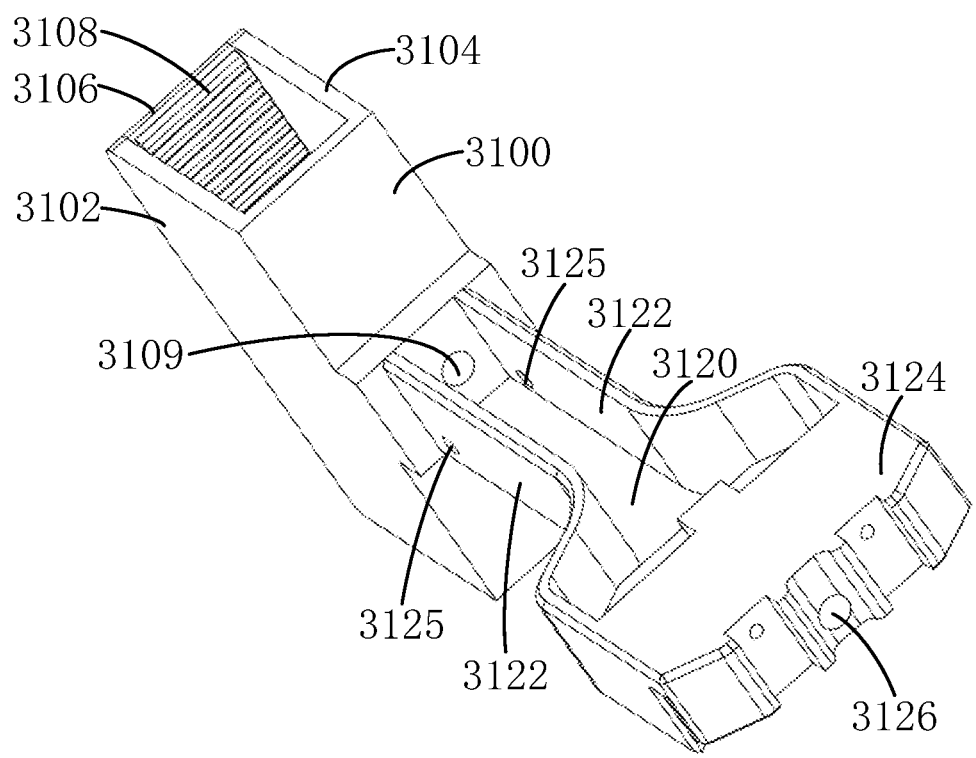
FIG. 4 is a schematic structural diagram of a sliding member of the clamping assembly shown in FIG. 2.

Referring to FIG. 4, the sliding member 31 includes a rod clamp 310 and a housing 312. The rod clamp 310 is sleeved on the vertical rod 20. One end of the housing 312 is connected to the rod clamp 310. An other end of the housing 312 is configured to carry the calibration element.

The rod clamp 310 includes a first clamping plate 3100, a second clamping plate 3102, a third clamping plate 3104 and a fourth clamping plate 3106. One end of the second clamping plate 3102 and one end of the third clamping plate 3104 are respectively connected to two opposite sides of the first clamping plate 3100. An other end of the second clamping plate 3102 and an other end of the third clamping plate 3104 are respectively connected to two opposite sides of the fourth clamping plate 3106. The first clamping plate 3100, the second clamping plate 3102, the third clamping plate 3104 and the fourth clamping plate 3106 jointly form a sliding groove. The vertical rod 20 passes through the sliding groove. The sliding member 31 is movable relative to the vertical rod in the length direction of the vertical rod 20. A gap 3107 is provided between an inner wall of the first clamping plate 3100 and the vertical rod 20. An inner wall of the second clamping plate 3102. An inner wall of the third clamping plate 3104 and an inner wall of the fourth clamping plate 3106 all abut against the vertical rod 20.

It may be understood that neither the second clamping plate 3102 nor the third clamping plate 3104 abuts against the vertical rod 20; or one of the second clamping plate 3102 and the third clamping plate 3104 abuts against the vertical rod 20, and it is only necessary to cause the fourth clamping plate 3106 to abut against the vertical rod 20.

A first friction plate 3108 is provided on the inner wall of the fourth clamping plate 3106. The first friction plate 3108 abuts against the vertical rod 20. The first friction plate 3108 is configured to increase friction between the first clamping plate 3100 and the vertical rod 20. The vertical rod 20 is connected to the sliding member 31 more stably.

A through hole 3109 is provided on the first clamping plate 3100. The through hole 3109 extends from the inner wall of the first clamping plate 3100 in a direction away from the fourth clamping plate 3106. The through hole 3109 runs through an outer wall of the first clamping plate 3100. The through hole 3109 is in communication with the gap 3107. An axial direction of the through hole 3109 is the same as the preset direction. The axial direction of the through hole 3109 is at the preset angle to the length direction of the vertical rod 20. Preferably, the axial direction of the through hole 3109 is perpendicular to the length direction of the vertical rod 20.

The housing 312 includes a panel 3120, a first side plate 3122 and a connecting portion 3124. A quantity of the first side plates 3122 is two. The two first side plates 3122 are respectively disposed on two opposite sides of the panel 3120. One end of the panel 3120 and one end of each of the two first side plates 3122 are all connected to one end of the connecting portion 3124. An other end of the panel 3120 and an other end of the two first side plate 3122 are both connected to the first clamping plate 3100. The panel 3120, the two first side plates 3122 and the connecting portion 3124 jointly form a receiving groove. The receiving groove is in communication with the through hole 3109. The handle 32 and the push rod assembly 33 are both received in the receiving groove. A first connecting hole 3125 is provided on each of the two first side plates 3122. Axes of the two first connecting holes 3125 coincide with each other. The axes of the two first connecting holes 3125 are both perpendicular to an axis of the through hole 3109.

A movable hole 3126 is provided on the connecting portion 3124. An axis of the movable hole 3126 coincides with the axis of the through hole 3109. The movable hole 3126 is in communication with the receiving groove. An arc-shaped groove 3127 is further provided on the connecting portion 3124. The arc-shaped groove 3127 is disposed on one side of the connecting portion 3124 that faces away from the base 10. Scales are further provided on the housing 312. The scales surround the arc-shaped groove 3127. An adjustment hole 3128 is further provided at one end of the connecting portion 3124 away from the sliding member 31. The adjustment hole 3128 is in communication with the movable hole 3126. An axis of the adjustment hole 3128 and the axis of the movable hole 3126 are perpendicular to each other.

Figure 5:
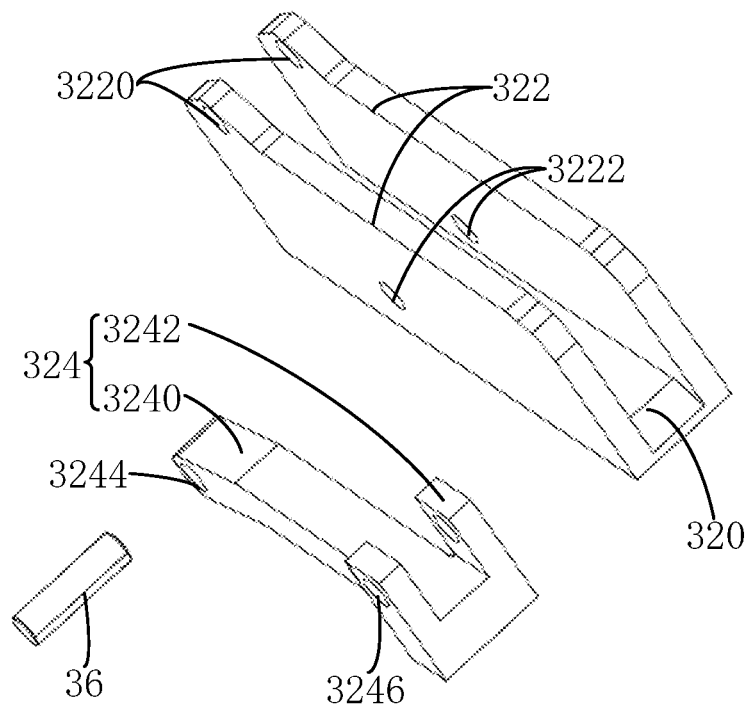
FIG. 5 is a schematic structural diagram of a handle of the clamping assembly shown in FIG. 2.

Referring to FIG. 5, the handle 32 includes a handle body. The handle body includes a bottom plate 320 and a second side plate 322. A quantity of the second side plates 322 is two. The two second side plates 322 are respectively disposed on two opposite sides of the bottom plate 320. The bottom plate 320 and the two second side plates 322 jointly form an accommodation groove.

A first hinge hole 3220 is provided on each of the two second side plates 322. The first hinge hole 3220 is disposed at one end of the second side plate 322 that faces the sliding member 31. The first hinge hole 3220 is disposed on one side of the second side plate 322 away from the bottom plate 320. Axes of the two first hinge holes 3220 coincide with the axes of the two first connecting holes 3125. The two second side plates 322 are both disposed between the two first side plates 3122. The two second side plates 322 are respectively connected to the two first side plates 3122 through a first hinge shaft 35. The first hinge shaft 35 respectively passes through the two first connecting holes 3125 and the two first hinge holes 3220. Two ends of the first hinge shaft 35 are respectively fixed to the two first side plates 3122. The first hinge shaft 35 is respectively pivotally connected to the two second side plates 322. The bottom plate 320 and a side plate 332 are both rotatable about the first hinge shaft 35 relative to the housing 312. A second connecting hole 3222 is provided on each of the two second side plates 322. Axes of the two second connecting holes 3222 coincide with each other. The axes of the second connecting holes 3222 are perpendicular to the axes of the first hinge holes 3220.

The handle 32 further includes a link 324. The link 324 is disposed in the accommodating groove. The link 324 includes a base portion 3240 and an extending portion 3242. The extending portion 3242 is disposed at one end of the base portion 3340. The extending portion 3342 extends from the base portion 3240 in a direction away from the bottom plate 320. A quantity of the extending portions 3242 is two. The two extending portions 3242 are respectively disposed on two opposite sides of the base portion 3240. A second hinge hole 3244 is provided at an other end of the base portion 3240. An axis of the second hinge hole 3244 coincides with the axes of the second connecting holes 3222. The base portion 3240 is disposed between the two second side plates 322. The base portion 3240 is respectively connected to the two second side plates 322 through the second hinge shaft 36. The second hinge shaft 36 respectively passes through the second connecting holes 3222 and the second hinge hole 3244. Two ends of the second hinge shaft 36 are respectively fixed to the two second side plates 322. The second hinge shaft 36 is pivotally connected to the base portion 3240. The link 324 is rotatable about the second hinge shaft 36 relative to the two side plates 332. A third connecting hole 3246 is provided on each of the two extending portions 3242. Axes of the two third connecting holes 3246 coincide with each other. The axes of the two third connecting holes 3246 are both parallel to the axis of the second hinge hole 3244.

Figure 6:
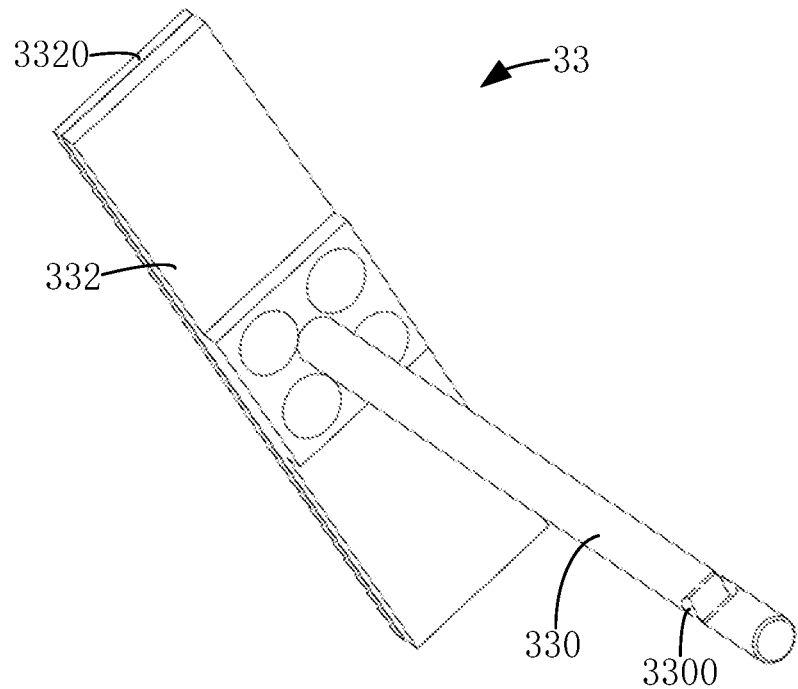
FIG. 6 is a schematic structural diagram of a push rod assembly of the clamping assembly shown in FIG. 2.

Referring to FIG. 6, the push rod assembly 33 includes a rod body 330 and a backing plate 332. The backing plate 332 is connected to one end of the rod body 330. A length direction of the backing plate 332 is perpendicular to an axial direction of the rod body 330. The backing plate 332 is disposed in the gap 3107. One end of the rod body 330 away from the backing plate 332 passes through the through hole 3109 and is received in the receiving groove.

A third hinge hole 3300 is provided at one end of the rod body 330 away from the backing plate 332. An axis of the third hinge hole 3300 coincides with the axes of the third connecting holes 3246. The rod body 330 is disposed between the two extending portions 3242. The rod body 330 is respectively connected to the two extending portions 3242 through a third hinge shaft 37. The third hinge shaft 37 respectively passes through the third connecting holes 3246 and the third hinge hole 3300. Two ends of the third hinge hole 3300 are respectively fixed to the two extending portions 3242. The third hinge shaft 37 is pivotally connected to the rod body 330. The push rod assembly 33 is rotatable about the third hinge shaft 37 relative to the link 324. The rod body 330 is movable relative to the sliding member 31 in the preset direction. The preset direction is the same as the axial direction of the rod body 330. An angle of an included angle between the axial direction of the rod body 330 and the length direction of the vertical rod 20 is the same as the preset angle.

A second friction plate 3320 is provided on the backing plate 332. The second friction plate 3320 is disposed on one side of the backing plate 332 that faces the vertical rod 20. The second friction plate 3320 abutting against the vertical rod 20 can increase friction between the clamping assembly 30 and the vertical rod 20. The vertical rod 20 is connected to the clamping assembly 30 more stably.

A quantity of the elastic members 34 is four. The four elastic members 34 are all disposed in the gap 3107. One end of the elastic member 34 abuts against one side of the backing plate 332 that faces the rod body 330. An other end of the elastic member 34 abuts against the inner wall of the first clamping plate 3100. A spring force of the elastic member 34 drives the backing plate 332 to abut against the vertical rod 20. The vertical rod 20 abuts against the first friction plate 3108. The clamping assembly 30 is fixed relative to the vertical rod 20. It may be understood that the elastic member 34 may be selected according to actual needs, such as a spring, a leaf spring or the like, as long as the spring force of the elastic member 34 can drive the backing plate 332 to abut against the vertical rod 20. It may be understood that, a quantity of the elastic members 34 may be set according to an actual requirement. For example, the quantity may be set to three, five and the like, as long as the quantity is at least one.

Figure 7:
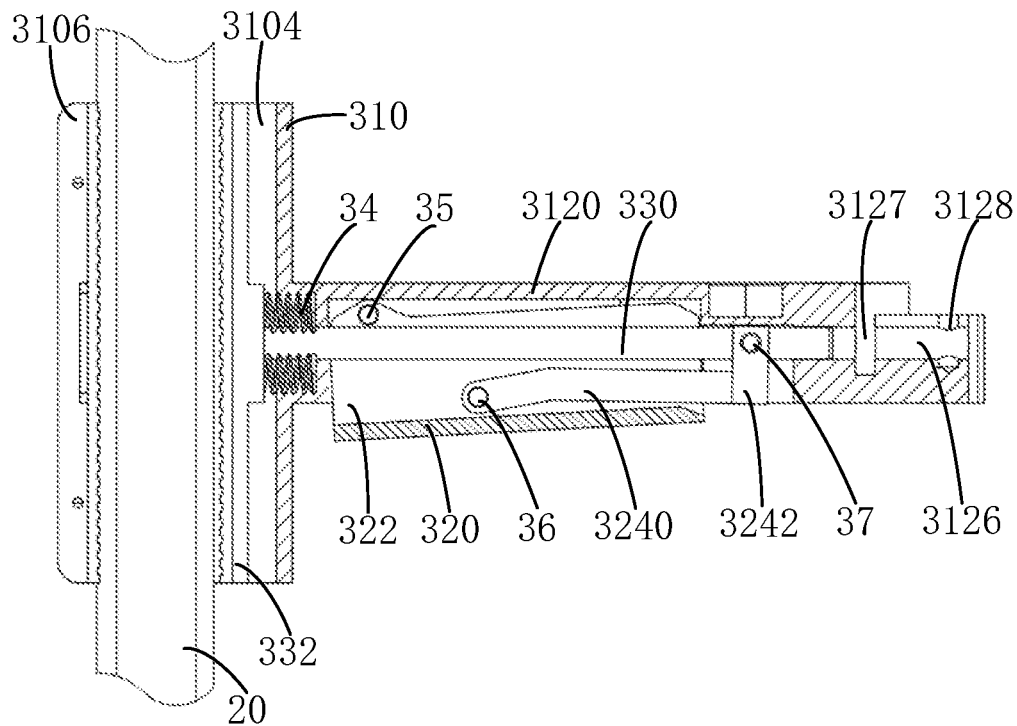
FIG. 7 is a schematic assembly diagram of a vertical rod and the clamping assembly of the bracket apparatus shown in FIG. 1 in a first state, where some elements are omitted.
Figure 8:
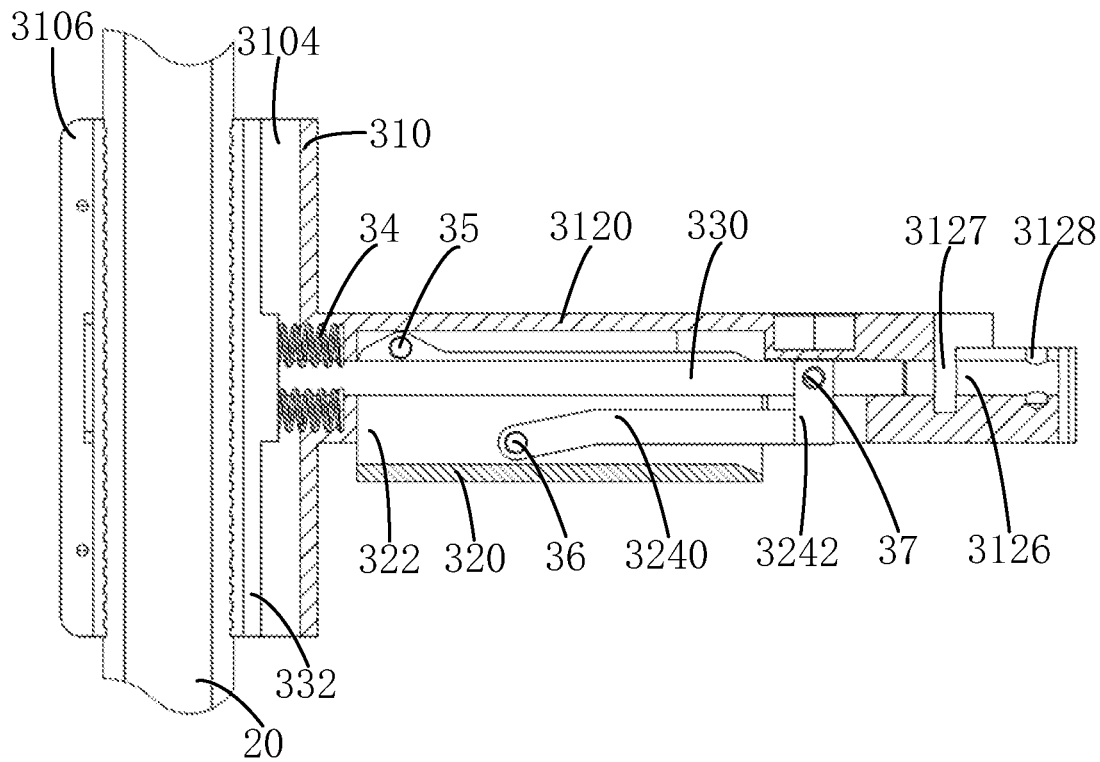
FIG. 8 is a schematic assembly diagram of the vertical rod and the clamping assembly shown in FIG. 7 in a second state, where some elements are omitted.

Referring to FIG. 7 and FIG. 8, when the main handle member is held upward, the bottom plate 320 and the second side plates 322 all rotate about the first hinge shaft 35 in the direction of the housing 312. The second side plate 322 drives the link 324. The link 324 pushes the rod body 330 to move in a direction away from the vertical rod 20. The rod body 330 pulls the backing plate 332 to move in a direction away from the vertical rod 20. The backing plate 332 compresses the elastic member 34 until the backing plate 332 no longer abuts against the vertical rod 20. The clamping assembly 30 is movable in the length direction of the vertical rod 20. When the main handle member is released, under the action of the spring force of the elastic member 34, the backing plate 332 is driven to move toward the vertical rod 20 until the backing plate 332 abuts against the vertical rod 20. Both the rod body 330 and the handle 32 are reset. The clamping assembly 30 and the vertical rod 20 are locked.

Figure 9:
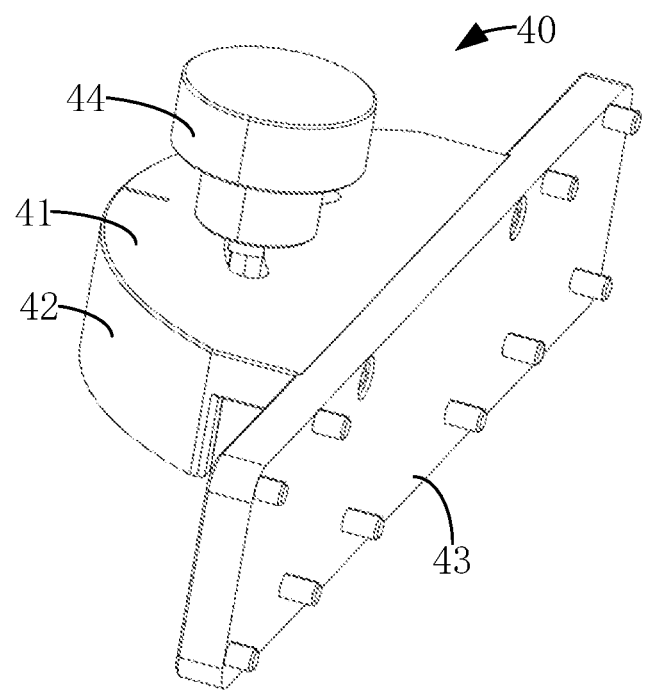
FIG. 9 is a schematic structural diagram of a holder of the bracket apparatus shown in FIG. 1.
Figure 10:
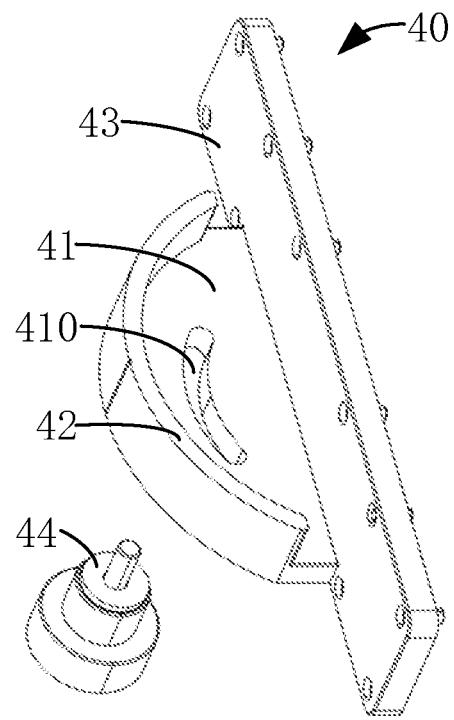
FIG. 10 is a schematic exploded view of the holder of the bracket apparatus shown in FIG. 9.

Referring to FIG. 9 and FIG. 10 together, the holder 40 includes a base plate 41, an arc-shaped portion 42, a fixed plate 43 and an adjustment rod 44. The arc-shaped portion 42 is disposed at one end of the base plate 41. The fixed plate 43 is connected to an other end of the base plate 41. The adjustment rod 44 is connected to the base plate 41 and the clamping assembly 30. The arc-shaped portion 42 extends from the base plate 41 toward the base 10. A shape of the arc-shaped portion 42 is mated with the arc-shaped groove 3127. The arc-shaped portion 42 is limited in the arc-shaped groove 3127. The arc-shaped portion 42 is movable in the arc-shaped groove 3127. One side of the fixed plate 43 is connected to the base plate 41. An other side of the fixed plate 43 is configured to be connected to the required calibration apparatus.

An adjustment groove 410 is provided on the base plate 41. The adjustment groove 410 is arc-shaped. The adjustment groove 410 runs through two surfaces of the base plate 41. An extending direction of the adjustment groove 410 is the same as an extending direction of the arc-shaped portion 42. A center of the adjustment groove 410 coincides with a center of the arc-shaped portion 42. The adjustment groove 410 is in communication with the adjustment hole 3128.

One end of the adjustment rod 44 passes through the adjustment groove 410 and is disposed in the adjustment hole 3128. The base plate 41 is connected to the clamping assembly 30. Preferably, the adjustment rod 44 and the adjustment hole 3128 are threadedly connected. After the adjustment rod 44 is tightened, the holder 40 is fixed relative to the clamping assembly 30. When the adjustment rod 44 is loosened, the arc-shaped portion 42 can move in the arc-shaped groove 3127. The adjustment groove 410 is movable relative to the adjustment rod 44. The required calibration apparatus hung on the fixed plate 43 can adjust the angle in the horizontal direction, and can obtain, by using the scales, angle values adjusted by the required calibration apparatus.

Figure 11:
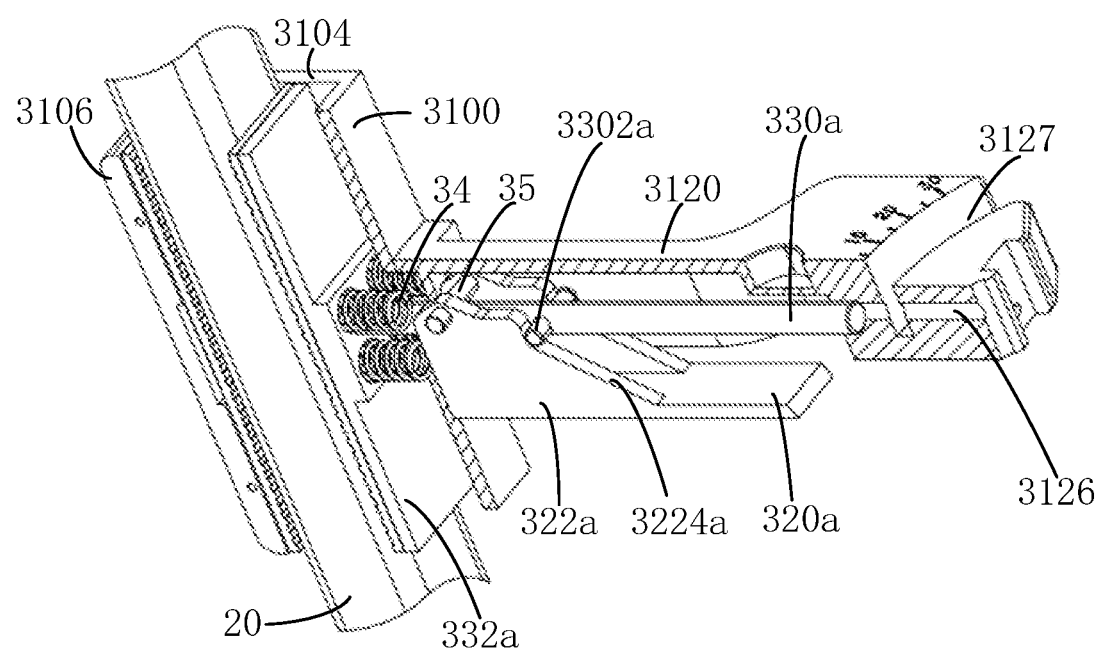
FIG. 11 is a schematic structural diagram of the clamping assembly of the bracket apparatus according to an embodiment of the disclosure, where some elements are omitted.

Referring to FIG. 11, a bracket apparatus 200 provided in another embodiment of the disclosure is basically the same as the bracket apparatus 100 shown in FIG. 1 and FIG. 2. A difference is that a handle 32a of the clamping assembly 30 and a push rod assembly 33a are different.

The handle 32a includes a bottom plate 320a and two second side plates 322a. The two second side plates 322a are respectively disposed on two opposite sides of the bottom plate 320a. A first hinge hole 3220a is provided on one end of each of the two second side plates 322a. The first hinge hole 3220a has the same structure as the first hinge hole 3220 of the bracket apparatus 100. For the connecting structure of the handle 32a and the housing 312, details will not be described herein again. An inclined face 3224a is provided on an other end of each of the two second side plates 322a. Included angles between the two inclined faces 3224a and the length direction of the bottom plate 320a are both acute angles.

The push rod assembly 33a includes a rod body 330a and a backing plate 332a. The backing plate 332a is connected to one end of the rod body 330a. The backing plate 332a has the same structure as the backing plate 332 of the bracket apparatus 100. The details will not be described herein again. An abutting post 3302a is provided on the rod body 330a. An axis of the abutting post 3302a is parallel to an axis of the first hinge hole 3220a. The rod body 330a is disposed between the two second side plates 322a. Two ends of the abutting post 3302a respectively abut against the two inclined faces 3224a.

Figure 12:
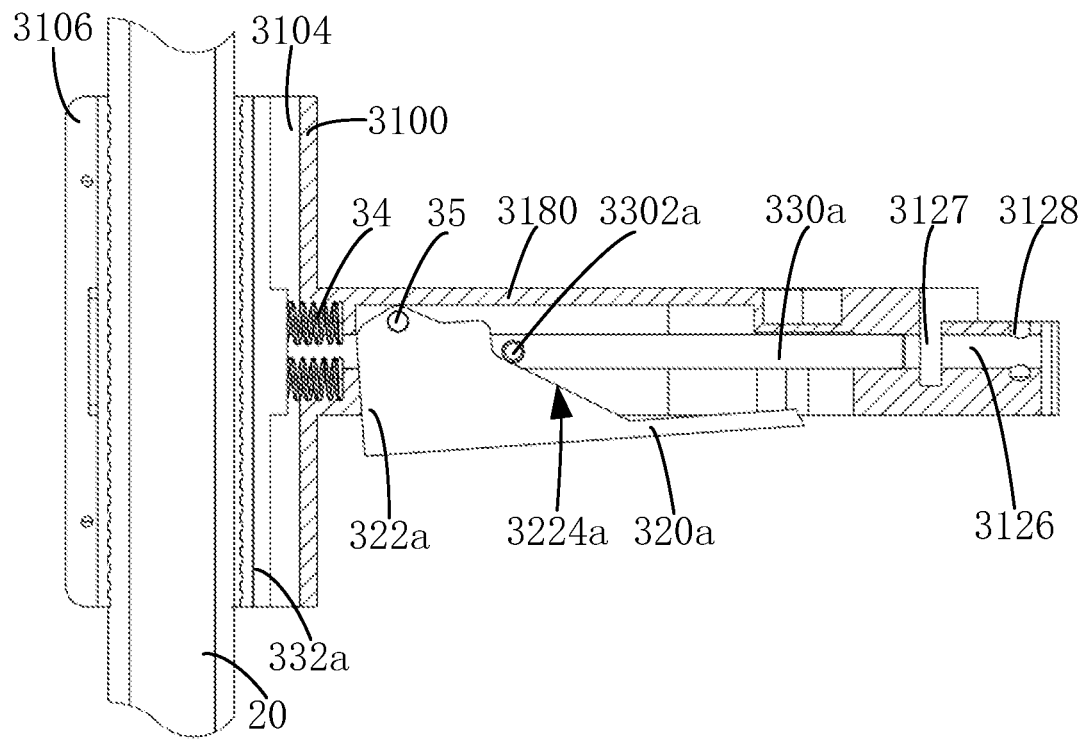
FIG. 12 is a schematic assembly diagram of the clamping assembly and the vertical rod shown in FIG. 11 in a first state, where some elements are omitted.
Figure 13:
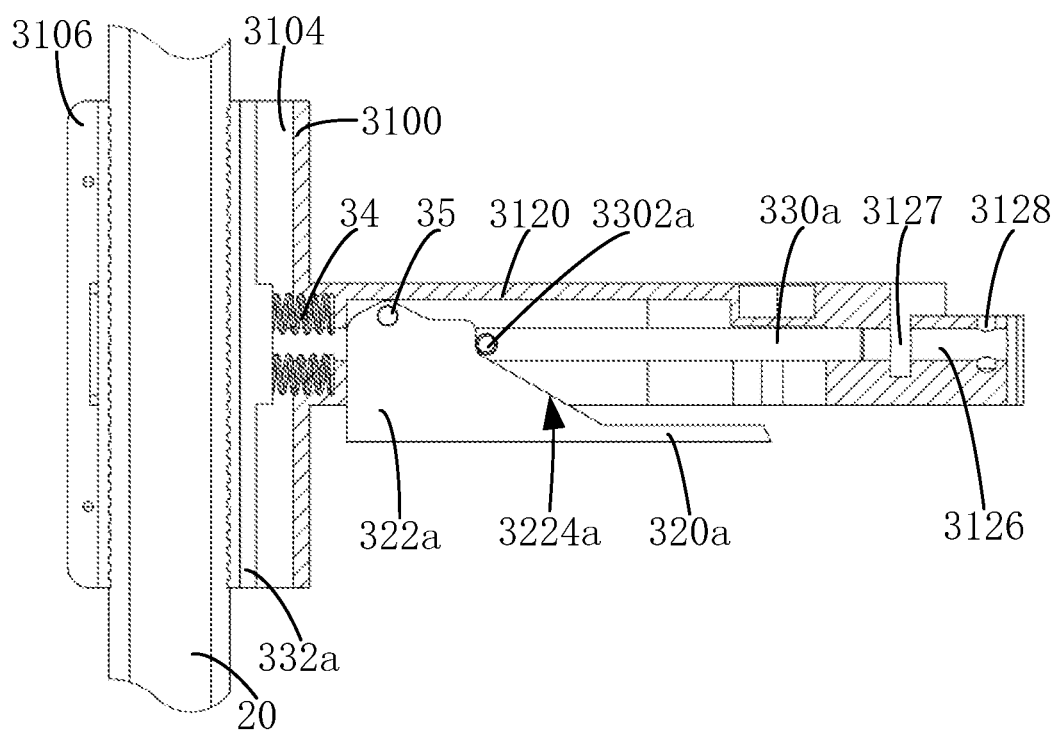
FIG. 13 is a schematic assembly diagram of the clamping assembly and the vertical rod shown in FIG. 12 in a second state, where some elements are omitted.

Referring to FIG. 12 and FIG. 13 together, when the handle 32a is held upward, the bottom plate 320a and the second side plates 322a all rotate about the first hinge shaft 35 toward the housing 312. The abutting post 3302a is driven to move along the inclined face 3224a and in a direction away from the vertical rod 20. The rod body 330a moves in a direction away from the vertical rod 20. The backing plate 332a compresses the elastic member 34 until the backing plate 332a no longer abuts against the vertical rod 20. The clamping assembly 30 is movable in the length direction of the vertical rod 20. When the handle 32a is released, under the action of the spring force of the elastic member 34, the backing plate 332a is driven to move toward the vertical rod 20. Both the rod body 330a and the handle 32a are reset. The clamping assembly 30 and the vertical rod 20 are locked.

Finally, it should be noted that the foregoing embodiments are merely used for describing the technical solutions of the disclosure, but are not intended to limit the disclosure. Under the concept of the disclosure, the technical features in the foregoing embodiments or different embodiments may be combined. The steps may be implemented in any sequence. There may be many other changes in different aspects of the disclosure as described above. For brevity, those are not provided in detail. Although the disclosure is described in detail with reference to the foregoing embodiments, those of ordinary skill in the art should understand that they may still make modifications to the technical solutions described in the foregoing embodiments or make equivalent replacements to some technical features thereof, without departing from the scope of the technical solutions of the embodiments of the disclosure.

What is claimed is:

1. A stand, comprising:
a base;
a vertical rod, one end of the vertical rod being mounted to the base; and
a clamping assembly, comprising a sliding member, a push rod assembly, a handle and an elastic member, wherein
the sliding member is sleeved on the vertical rod and is configured to hang a calibration element;
the push rod assembly comprises a rod body and a backing plate, one side of the backing plate being in contact with the vertical rod, and an other side of the backing plate being connected to the rod body;
the elastic member is disposed between an inner wall of the sliding member and the backing plate and is configured to provide an elastic restoring force, so that the backing plate tightly abuts against the vertical rod;
the handle is configured to drive the rod body to move away from the vertical rod; and
when the handle drives the rod body to move away from the vertical rod, the backing plate is removed from contact with the vertical rod, so that the sliding member is movable in a length direction of the vertical rod.

2. The stand according to claim 1, wherein the sliding member comprises a rod clamp and a housing;
the rod clamp is sleeved on the vertical rod and is movable along the vertical rod; and
one end of the housing is connected to the rod clamp, and the handle is rotatably mounted to the housing.

3. The stand according to claim 2, wherein an axis of rotation of the handle is perpendicular to a direction of movement of the rod body.

4. The stand according to claim 2, wherein the rod clamp comprises a first clamping plate, a second clamping plate, a third clamping plate and a fourth clamping plate;
the first clamping plate and the fourth clamping plate are opposite to each other, and the second clamping plate and the third clamping plate are opposite to each other and are both connected between the first clamping plate and the fourth clamping plate;
the first clamping plate is spaced apart from the vertical rod, and the backing plate is located between the first clamping plate and the vertical rod; and
the fourth clamping plate abuts against the vertical rod.

5. The stand according to claim 4, wherein a first friction plate is provided on the fourth clamping plate; and
the fourth clamping plate abuts against the vertical rod through the first friction plate.

6. The stand according to claim 4, wherein the second clamping plate and/or the third clamping plate abut(s) against the vertical rod.

7. The stand according to claim 2, wherein the housing comprises two first side plates; and
- the handle and the rod body are both disposed between the two first side plates, and the handle is rotatably connected to the two first side plates.

8. The stand according to claim 2, wherein the handle comprises a handle body and a link;
- one end of the handle body is rotatably connected to the housing; and
- one end of the link is rotatably connected to an other end of the handle body, and an other end of the link is rotatably connected to the rod body.

9. The stand according to claim 2, wherein an inclined face is provided on the handle, and an abutting post is provided on the rod body, the abutting post abutting against the inclined face; and
- the handle pushes the abutting post during rotation, so that the abutting post moves along the inclined face to drive the push rod assembly to move.

10. The stand according to claim 2, wherein a movable hole is provided on the housing; and
- one end of the rod body facing away from the backing plate is received in the movable hole, and the rod body is movable along the movable hole.

11. The stand according to claim 2, wherein the bracket apparatus comprises a holder mounted to the housing; and
- the holder is configured to carry the calibration element.

12. The stand according to claim 11, wherein the holder comprises a base plate, an arc-shaped portion and a fixed plate;
- the arc-shaped portion and the fixed plate are respectively disposed at two opposite ends of the base plate;
- an arc-shaped groove is provided on the housing, the arc-shaped portion being mounted to the arc-shaped groove, and the arc-shaped portion being slidable along the arc-shaped groove; and
- the fixed plate is configured to be connected to the calibration element.

13. The stand according to claim 12, wherein the holder comprises an adjustment rod;
- an arc-shaped adjustment groove is provided on the base plate, and an adjustment hole is provided on the sliding member, one end of the adjustment rod passing through the adjustment groove and being disposed in the adjustment hole, and the adjustment groove being slidable relative to the adjustment rod; and
- when the adjustment rod is tightened, the holder is fixed relative to the clamping assembly, and when the adjustment rod is loosened, the holder is movable relative to the clamping assembly.

14. The stand according to claim 1, wherein the direction of movement of the rod body is perpendicular to the length direction of the vertical rod.

15. The stand according to claim 1, wherein a second friction plate is provided on one side of the backing plate facing the vertical rod; and
- the backing plate abuts against the vertical rod through the second friction plate.

* * * * *